(12) United States Patent
Lefranc

(10) Patent No.: US 8,471,399 B2
(45) Date of Patent: Jun. 25, 2013

(54) FLOATING WIND POWER APPARATUS

(75) Inventor: Marc Lefranc, Oslo (NO)

(73) Assignee: Windsea AS, Sandvika (NO)

( * ) Notice: Subject to any disclaimer, the term of this patent is extended or adjusted under 35 U.S.C. 154(b) by 519 days.

(21) Appl. No.: 12/743,307

(22) PCT Filed: Nov. 19, 2008

(86) PCT No.: PCT/NO2008/000412
§ 371 (c)(1),
(2), (4) Date: Sep. 16, 2010

(87) PCT Pub. No.: WO2009/067023
PCT Pub. Date: May 28, 2009

(65) Prior Publication Data
US 2011/0006539 A1    Jan. 13, 2011

(30) Foreign Application Priority Data
Nov. 19, 2007  (NO) .................................... 20075934

(51) Int. Cl.
*F03D 9/00* (2006.01)
*F03B 13/00* (2006.01)

(52) U.S. Cl.
USPC .................................. 290/55; 290/44; 415/7

(58) Field of Classification Search
USPC .................. 290/43, 44, 54, 55; 416/85; 415/7
See application file for complete search history.

(56) References Cited

U.S. PATENT DOCUMENTS

| | | | | |
|---|---|---|---|---|
| 4,110,631 A | * | 8/1978 | Salter | 290/55 |
| 5,876,181 A | * | 3/1999 | Shin | 415/2.1 |
| 6,100,600 A | * | 8/2000 | Pflanz | 290/54 |
| 6,294,844 B1 | * | 9/2001 | Lagerwey | 290/55 |
| 7,075,189 B2 | * | 7/2006 | Heronemus et al. | 290/44 |
| 8,022,566 B2 | * | 9/2011 | Loh et al. | 290/44 |
| 8,169,099 B2 | * | 5/2012 | Roznitsky et al. | 290/44 |
| 8,197,208 B2 | * | 6/2012 | Sharples et al. | 416/85 |
| 8,275,489 B1 | * | 9/2012 | Devine | 700/287 |
| 2001/0002757 A1 | | 6/2001 | Honda et al. | |

FOREIGN PATENT DOCUMENTS

| | | |
|---|---|---|
| EP | 0761964 A1 | 3/1997 |
| FR | 970120 A | 12/1950 |
| FR | 2738300 A1 | 3/1997 |
| FR | 2752443 A1 | 2/1998 |
| FR | 2868483 A1 | 10/2005 |
| JP | 2005264865 A | 9/2005 |
| WO | 0036299 A1 | 6/2000 |
| WO | 02073032 A1 | 9/2002 |

OTHER PUBLICATIONS

PCT/NO2008/000412 International Search Report, Mar. 11, 2009.
Norwegian Application No. 20075934 Search Report, Jun. 4, 2008.

* cited by examiner

*Primary Examiner* — Nicholas Ponomarenko
(74) *Attorney, Agent, or Firm* — Conley Rose, P.C.

(57) ABSTRACT

The present invention concerns a floating wind power apparatus with a floating unit and at least three rotors supported in rotor housings, placed on separate towers with a longitudinal central axis. The towers are attached in the floating unit and the rotor housing, and the floating unit may yaw to direct the rotors in relation to the wind. At least one rotor is a downwind rotor, and at least one rotor is an upwind rotor. The towers are placed at an inclined angle in relation to the rotors.

10 Claims, 3 Drawing Sheets

FLOATING WIND POWER APPARATUS

CROSS-REFERENCE TO RELATED APPLICATIONS

This application is a 35 U.S.C. §371 national stage application of PCT Application No. PCT/NO2008/000412, filed 19 Nov. 2008, and entitled Floating Wind Power Apparatus, hereby incorporated herein by reference, which claims priority to Norway Patent Application No. 2007 5934, filed 19 Nov. 2007, hereby incorporated herein by reference.

STATEMENT REGARDING FEDERALLY-SPONSORED RESEARCH OR DEVELOPMENT

Not applicable.

BACKGROUND

The present invention concerns a floating wind power apparatus with a floating unit and at least three rotors supported in rotor housings or nacelles. The rotor housings are placed on separate towers with a longitudinal central axes. The towers are attached to the floating unit and to the rotor housings. The floating unit can turn to direct the rotors in relation to the wind. At least one of the rotors is a downwind rotor, and at least one rotor is an upwind rotor. The towers are placed at an inclined angle in relation to the rotors. Rotor, turbine, propeller or mill is in this connection meant to describe that part of the apparatus that is put in rotation by the wind and that transfers the energy of the wind to mechanical energy.

When floating wind power generators are placed in bodies of water, there are a number of challenges in relation to anchoring, handling of big waves, ice, corrosion and maintenance. For such plants it is also a challenge to keep the plane of the rotors in a plane perpendicular in relation to the direction of the wind, in particular in the vertical plane, as the wind has a tendency to pivot the structure such that the rotors are inclined in relation to a vertical direction.

In EP 1 106 825 it is shown a floating plant with three wind turbines are placed on a floating platform. The turbines are placed on vertical towers and all the turbines are upwind turbines.

In NL 1008318C it is shown a floating wind turbine island with a number of upwind wind turbines placed on vertical towers at each corner of a floating unit.

In DE 102004049506 it is shown a wind power plant with a number of rotors placed on a pontoon. The rotors are mechanically connected to each other and drive a common generator.

However none of the publications show solutions with a combination of upwinds- and downwind rotors on separate, inclined towers such that an improved balance is achieved in combination with a reduced disturbance of the wind for the downwind rotor/rotors in the same way as in the present invention.

In connection with downwind rotors it is a problem that wind disturbances from the tower create disturbances on the rotor that can result in uneven load that may result in reduced efficiency, vibrations and fatigue fractures.

When floating wind turbines are placed separately in bodies of water, must each turbine be anchored, maintained, and export energy separately.

SUMMARY

It is a purpose with the present invention to provide a system that enables that several rotors and thereby more energy can be handled as one unit, such that the energy from several rotors can be brought onshore jointly, several rotors can be maintenance simultaneously, several rotors can be moored with one mooring etc.

Furthermore it is a purpose to provide a structure for downwind rotors that result in less vibrations and disturbances in the power production and reduces the probability of fatigue fractures.

Furthermore it is a purpose with the present invention to provide a structure that provides improved stability and that maintain the turbines perpendicular in relation to the direction of the wind.

Furthermore it is a purpose with the invention to optimize the area that can take up wind energy in relation to the size of the floating structure.

Furthermore it is a purpose with the invention to provide an apparatus that eases installation and maintenance, and that improves the environment and safety during repair and maintenance.

By placing several rotors on the same floating unit the centre of gravity is less critical in relation to solutions with one single turbine generating the same amount of energy, as such a wind turbine would have to be very tall and because such turbines normally are placed on floating columns where the centre of gravity must be placed below the centre of buoyancy to provide sufficient stability. It is also other considerable problems with wind turbines with dimensions of that magnitude, both in terms of mechanical loads, balancing, handling and maintenance.

Accordingly the present invention concerns a floating wind power apparatus with a floating unit and at least three rotors supported in rotor housings, placed on separate towers. The floating unit may be a "barge structure", a truss work structure, or have a structure as a semi submersible platform. The towers are typically made of steel, aluminum or a composite material. The floating unit is typically made of steel, aluminum, a composite material or concrete. The unit may be designed to take in ballast. The towers have a longitudinal central axis and are attached to the floating unit and to the rotor housings. The floating unit can be turned to direct the rotors in relation to the wind. Turn or yaw of the floating unit will yaw all the rotors simultaneously. At least one rotor is a downwind rotor, and at least one rotor is an upwind rotor. This creates good balance and efficient use of the area the turbines act on. At least one of the towers is placed at an inclined angle in relation to the rotors. This is particularly advantageous in relation to the downwind rotor, and allows the rotor housings to be placed "outside" the floating unit, such that the size of the floating unit can be reduced in relation to the effective area the rotors act on. The other towers may however also be inclined, even if not all the towers need to be so. Solutions where the upwind rotors are placed on inclined towers and where the downwind rotor is placed on a straight tower are also possible. Solutions with one straight upwind tower and two inclined downwind towers with corresponding downwind rotors are also possible.

The distance between the towers may be shorter by the floating unit than by the rotor housings, as the towers are inclined outwards and away from each other. This enables a greater area to be covered than what the size of the platform should indicate. In that the towers can be inclined away from each other, the rotors can be placed further apart than if the towers had been vertical.

Each rotor defines a plane of revolution, perpendicular to each axis of revolution. These planes may be substantially parallel, as each rotor shall be driven by wind with substantially the same direction.

The plane of revolution of each rotor and the longitudinal central axis of each tower form an inclined angle in relation to each other such that the distance between each rotor blade and the tower is increasing with increasing distance from the housing or nacelle toward the tip of the rotor blade, even when the tower and the rotor blade is in the same plane.

It may be three rotors, and each tower may be attached in the floating unit at a mutual distance such that each tower form a corner of a triangle, and such that the longitudinal axes of each tower extend inclined outwards from each corner of this triangle and such that each tower form an angle of between 10° and 40° in relation to a vertical direction. However it may well be more towers and rotors in a combination of upwind and downwind rotors that can collect an area depending on the size of the rotors and the number of rotors.

The angle of the towers may be substantially 20° in relation to a horizontal plane, but each tower may have a different angle, and the angle can be adjusted in relation to what is desirable in relation to the wind conditions and mechanical factors.

The downwind rotor/rotors can be placed higher than upwind rotor/rotors.

The floating unit may be designed as a triangle with each tower extending upwards from each corner of this triangle. The floating unit may be a tubular structure. The elements of the tubular structure may be circular, oval, be a rectangular hollow section or include any suitable cross section.

The floating unit could also be shaped for instance as a trapezoid with three rotors on the upwind side and two on the downwind side. This provides 66% more rotors on three times as big area, but the structure will become smaller due to fewer vertical elements. The infrastructure in this case must be divided between five rotors instead of three.

The floating unit or platform may be ballastable.

The energy production of the rotors can be summed in a common unit on the floating unit and can be brought onshore with a common cable for transferring energy. The energy may be generated in the nacelles by a generator, with or without brushes or transmission/gearing. Alternatively the energy may be transferred to the floating unit mechanically, and may drive a generator on the buoyant unit. In this case may a common generator be driven by the various rotors. When several rotors are used, may the current from these be coordinated with suitable power electronics or in other ways. Equipment that handles this can easily be placed on the floating unit.

The floating unit may be moored through for instance a revolving cylinder or turret, well known within bunkring of oil to tankers etc., where a revolving cylinder goes into an adapted unit in a vessel.

Correspondingly may a turret be used and may go into the floating unit, and may ensure that the floating unit may rotate in relation to wind, at the same time as it may provide for connection for bringing onshore energy and other connections for surveillance and control.

Other forms of mooring, well known within maritime subject areas may also be used. There are today several forms of swivels that may be used, and that allows yaw and transfer of energy and signals. It is however a considerable advantage if the connection and the mooring easily can be connected and disconnected from the floating unit such that the wind power apparatus may be brought onshore for repair and maintenance.

The mooring may be left where the apparatus is to be placed and may be anchored in a suitable buoy or the like when it not is in use such that the mooring easily can be found and used again. When using a turret, may this also be left when the apparatus must be removed in a common way.

It is also an advantage if the connection easily can be made when the wind power apparatus has been brought on site for energy production.

The wind power apparatus may revolve in relation to the wind due to units that provides a weather vane effect, or can be provided by individual control of the wind turbines, either by individual control of each single turbine, or by individual control of each single rotor blade.

The control of the rotors in this connection would be control of the pitch of the rotor blades. Individual control of rotor blades such that the rotor blades not have the same pitch through the entire revolution is known technology from several subject areas and may in this connection be used with advantage to achieve yaw of the entire apparatus, balance, improved efficiency etc. The rotor blades may be designed such that they can be pitched to completely stop the rotors in the event of a breakdown, transport, maintenance, accidents or due to extreme weather conditions. The control may receive information about wind conditions, waves, inclination, the placement of the wind power apparatus etc. from land and from sensors on the apparatus. Cameras can be placed on the apparatus for monitoring purposes.

The apparatus may also be equipped with a motor in the point of revolution and may be yawed against the wind by means of one or several sensors that control the motor. The motor may be in connection with a gear rim that may revolve the apparatus, and may be controlled by sensors.

The floating unit must ensure sufficient stability and buoyancy for the entire structure both in anchored and in a non-anchored condition. The floating unit may be a barge like structure, have a truss work or jacket-like structure or be made as some other semi submersible structure.

DETAILED DESCRIPTION OF THE EMBODIMENTS

Figure 1:
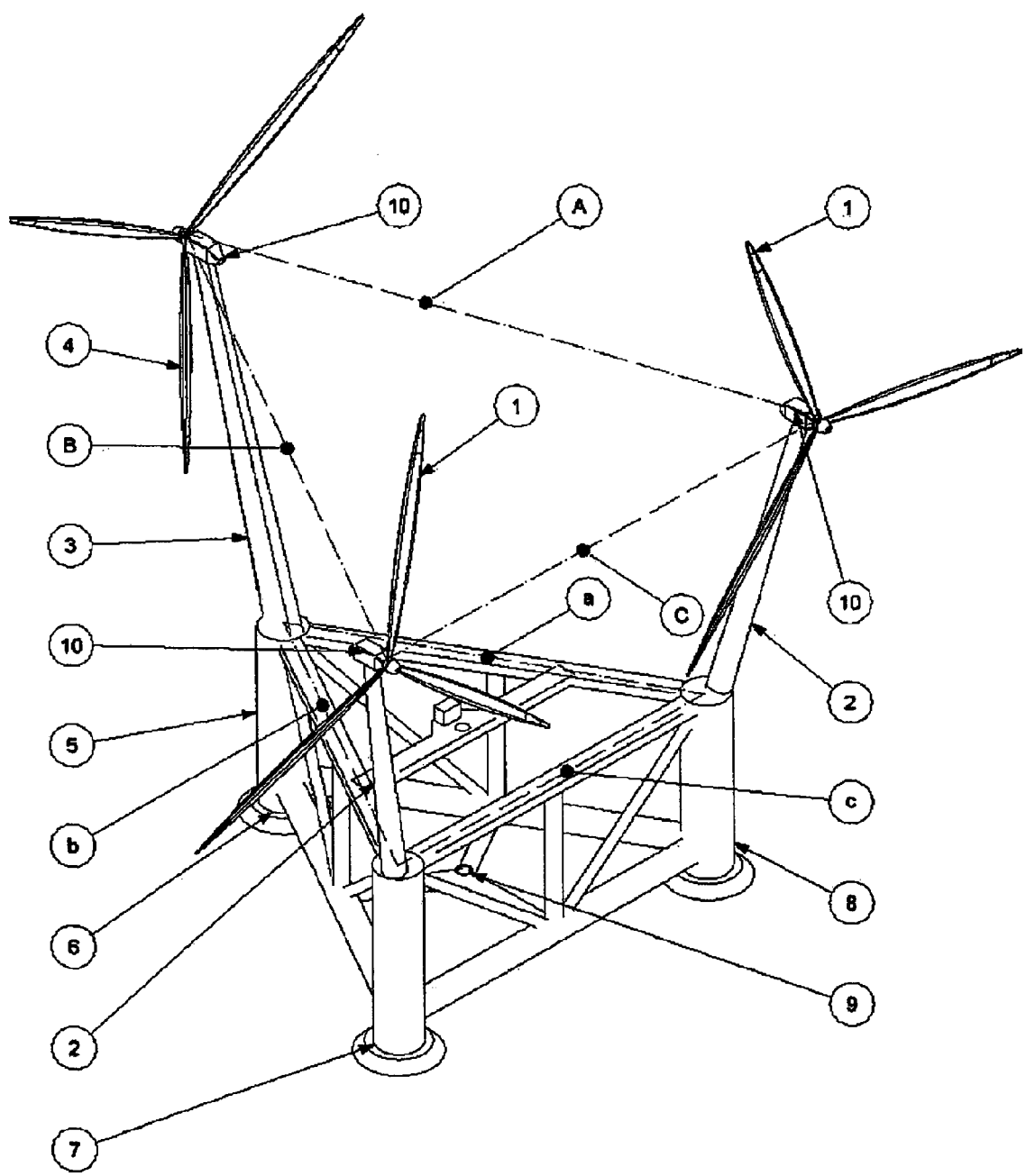
FIG. 1 shows an embodiment of a floating wind power apparatus according to the invention.

Detailed description of the embodiments of the invention with reference to the enclosed figures:

In FIG. 1 it is shown a floating wind power apparatus according to the invention. The apparatus includes a floating unit 5 and at least three rotors 1, 4 supported in rotor housings 10, placed on separate towers 2, 3. The towers 2, 3 have a longitudinal central axis and are attached in the floating unit 5 and the rotor housing 10. The floating unit 5 may yaw to direct the rotors 1, 4 in relation to the wind. The rotor 4 on FIG. 1 is a downwind rotor placed on tower 3, and the two rotors 1, placed on towers 2 are upwind rotors. The upwind towers 2 are placed at an inclined angle α in relation to a horizontal direction and the downwind tower 3, is placed at an inclined angle β in relation to a horizontal direction.

The distance a, b, c between the three towers 2, 3 at the floating unit 5 is less than the distance A, B, C between the towers 2, 3 at the rotor housing 10, such that the towers 2, 3 points away from each other.

As shown, the three rotors 1, 4 revolve about substantially parallel axes of revolution.

The floating unit is designed as a triangle, and each tower 2, 3 is attached to the floating unit 5 with a mutual distance a, b, c such that each tower 2, 3 is attached in each corner 6, 7, 8 of the triangle. The longitudinal axes of each tower 2, 3 extend with an inclined angle outwards from each corner 6, 7, 8 of the triangle.

The floating unit 5 is a tubular structure with internal floating tanks and possibly ballasts tanks for stabilizing, adjustment of the placing of the apparatus in the water and for balancing. The ballast tanks may be connected to suitable pumps and control systems (not shown). The tubes of the structure may form a truss work structure common within the offshore area. The ballasting may also be made dynamical such that the unit can be kept at a predetermined angle during various wind conditions.

A connection 9 is shown at the centre of the floating unit 5 for connection with a revolving cylinder or turret (not shown).

Figure 2:
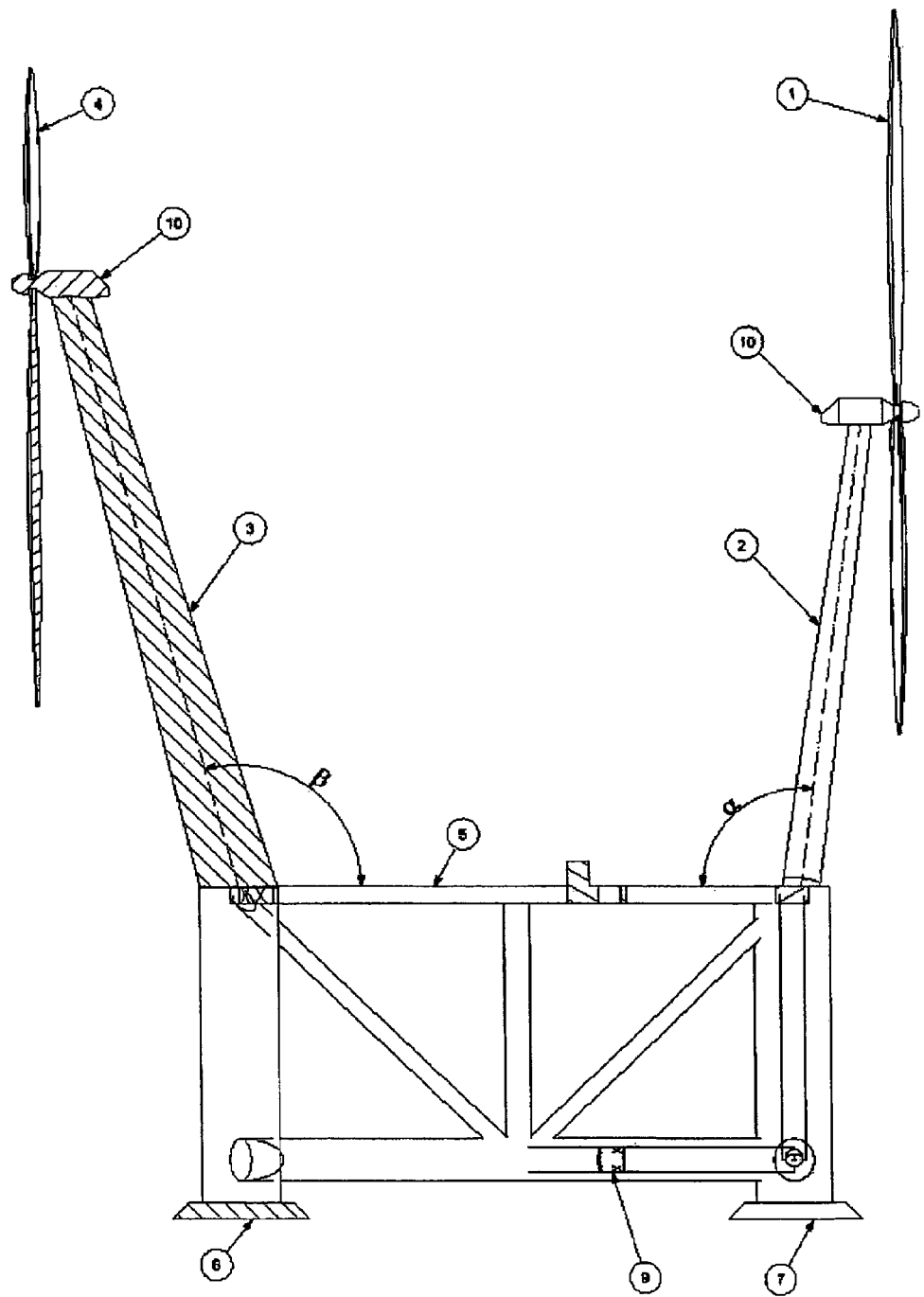
FIG. 2 shows the embodiment shown on FIG. 1 from the side.

FIG. 2 is a side elevation of FIG. 1, where the tower angles α, β are shown and where it is clearly shown how the towers 2, 3 for the upwind rotors 1 and the downwind rotor 4 are directed away from each other, such that the towers 2, 3 are inclined away from each other and such that the distance between the rotors is increased, and the disturbances of the wind are reduced. It is also clearly shown how each tower 2, 3 is placed in the corners 6, 7 of the floating unit 5, and how the towers 2, 3 extend between the rotor housing 10 and the floating unit 5. From the figure it is also shown that the downwind tower 3 is taller than the upwind towers 2. The height of the towers 2, 3 and the diameter of the rotors 1, 4 are designed such that the unit is balanced in operation. The placing of the attachment point 9 for the floating unit 5 is also shown. The tower angle α that is shown on FIG. 2 shows that the tower is inclined forwards. FIG. 2 does not show that the tower also is inclined to the side.

Figure 3:
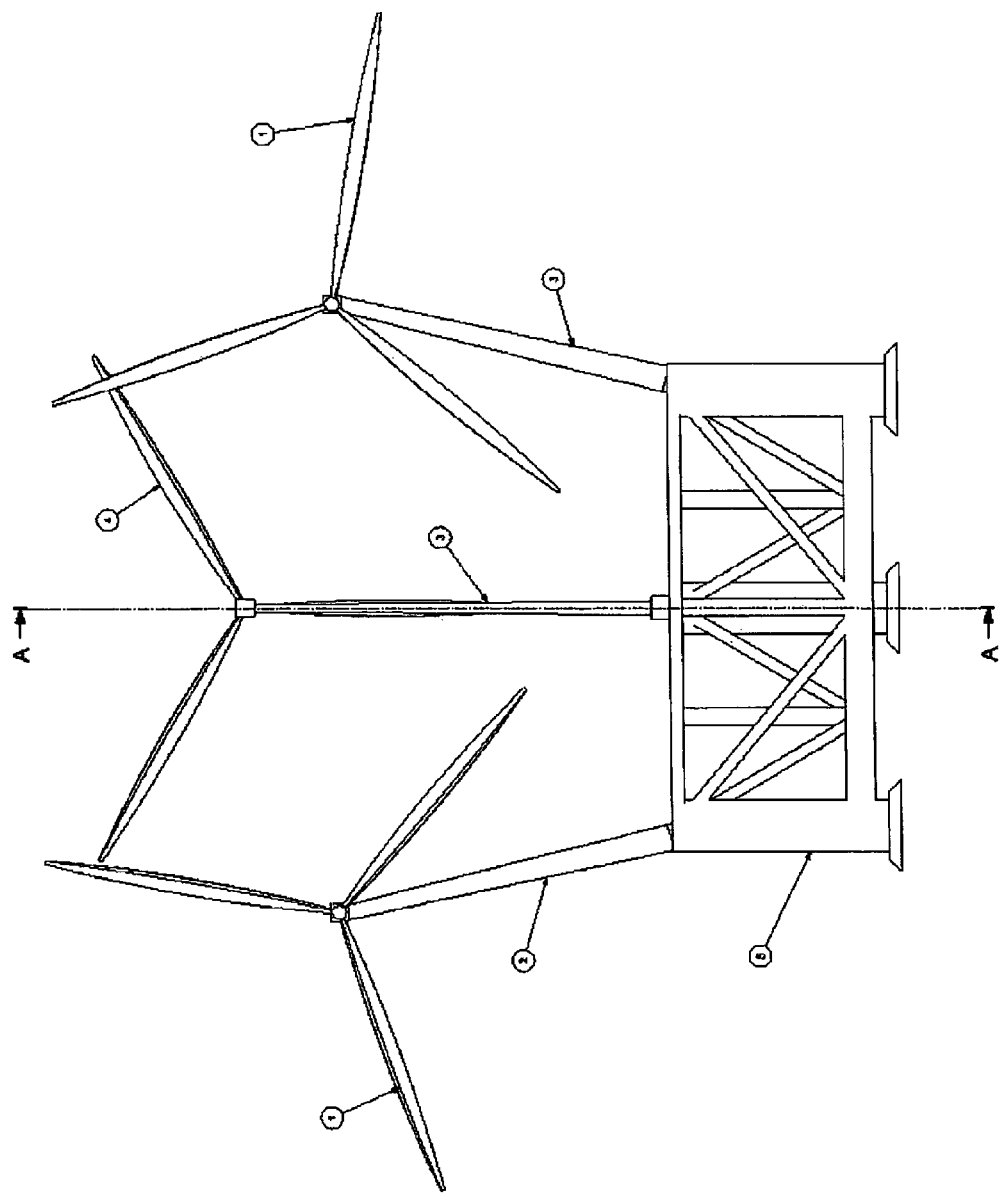
FIG. 3 shows the embodiment of FIG. 1 from the front.

In FIG. 3 it is shown how the upwind towers 2 are inclined outwards to the side, and that the downwind tower 3 is taller than upwind towers 2, 3. Furthermore it is shown how the area that is covered by the upwind rotors 1 to somewhat overlap the area that is covered by the downwind rotor 4. The placement of the towers on the floating unit 5 is also shown.

The entire apparatus may of course be used backwards, such that the rotors that are described as upwind rotors become downwind rotors etc.

The invention claimed is:

1. Floating wind power apparatus with a floating unit and at least three rotors supported in rotor housings, placed on separate towers, with a longitudinal central axis, attached to the floating unit and the rotor housing (10), where a floating unit may yaw to direct the rotors in relation to the wind, characterized in that: at least one rotor is a downwind rotor, at least one rotor is an upwind rotor; at least the tower with the downwind rotor is placed at an inclined angle in relation the axes of revolution of the rotor; and a connection at the centre of the floating unit for connection to a revolving cylinder, swivel or turret.

2. The apparatus according to claim 1, wherein the distance between the at least three towers is less at the floating unit than by the rotor housings.

3. The apparatus according to claim 1, wherein each rotor defines its plane of revolution, and where these planes are substantially parallel.

4. The apparatus according to claim 3, wherein the plane of revolution of each rotor and the longitudinal central axis of each tower form an inclined angle in relation to each other.

5. The apparatus according to claim 1, wherein there are three rotors and where each tower is attached in the floating unit at a mutual distance such that each tower form a corner in a triangle, and such that the longitudinal axis of each tower extend with an inclined angle outwards from each corner of this triangle and such that each tower form an angle of between 10° and 40° in relation to a vertical direction.

6. The apparatus according to claim 5, wherein the angle is substantially 20°.

7. The apparatus according to claim 5, wherein the floating unit is shaped as a triangle with each tower extending upward from each corner of this triangle.

8. The apparatus according to claim 7, wherein the floating unit can be ballasted.

9. The apparatus according to claim 1, wherein the energy production of the rotors may be summed in a unit on the floating unit and may be exported with a common cable for transferring of energy.

10. The apparatus according to claim 2, wherein the downwind rotor is placed higher than the upwind rotor.

* * * * *

UNITED STATES PATENT AND TRADEMARK OFFICE
CERTIFICATE OF CORRECTION

PATENT NO. : 8,471,399 B2 Page 1 of 1
APPLICATION NO. : 12/743307
DATED : June 25, 2013
INVENTOR(S) : Marc Lefranc It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 639 days.

Signed and Sealed this
Eighth Day of September, 2015

Michelle K. Lee
*Director of the United States Patent and Trademark Office*